US011755669B2

(12) United States Patent
Abuelsaad et al.

(10) Patent No.: US 11,755,669 B2
(45) Date of Patent: Sep. 12, 2023

(54) METHODS AND SYSTEMS FOR RETRIEVING AND STORING TELEPHONE NUMBERS ALONG WITH RELATED CONTEXTUAL INFORMATION ASSOCIATED WITH INBOUND/OUTBOUND COMMUNICATIONS TO/FROM A DEVICE

(71) Applicant: KYNDRYL, INC., New York, NY (US)

(72) Inventors: Tamer E. Abuelsaad, Yorktown, NY (US); John E. Moore, Jr., Pflugerville, TX (US); Rajeshkumar N. Singi, Marietta, GA (US); Robert R. Wentworth, Round Rock, TX (US)

(73) Assignee: KYNDRYL, INC., New York, NY (US)

( * ) Notice: Subject to any disclaimer, the term of this patent is extended or adjusted under 35 U.S.C. 154(b) by 481 days.

(21) Appl. No.: 16/685,163

(22) Filed: Nov. 15, 2019

(65) Prior Publication Data

US 2020/0081928 A1 Mar. 12, 2020

Related U.S. Application Data

(62) Division of application No. 13/888,733, filed on May 7, 2013, now Pat. No. 10,521,480.

(51) Int. Cl.
*G06F 16/9535* (2019.01)
*G06F 16/335* (2019.01)
*G06F 16/338* (2019.01)

(52) U.S. Cl.
CPC ........ *G06F 16/9535* (2019.01); *G06F 16/335* (2019.01); *G06F 16/338* (2019.01)

(58) Field of Classification Search
CPC ........................... G06F 16/156; G06F 16/9535
See application file for complete search history.

(56) References Cited

U.S. PATENT DOCUMENTS

| | | |
|---|---|---|
| 6,975,712 B1 | 12/2005 | Schnarel et al. |
| 7,046,994 B1 | 5/2006 | Padawer et al. |
| 7,184,527 B1 | 2/2007 | Lin et al. |
| 8,611,873 B2 | 12/2013 | Onyon et al. |
| 8,774,767 B2 | 7/2014 | Yoo et al. |

(Continued)

OTHER PUBLICATIONS

Mangla A., et al., "Enhancing Call-Detail Reporting Using Multimedia Technologies", Multimedia at Work, Oct.-Dec. 1998, pp. 74-77.

(Continued)

*Primary Examiner* — Cheyne D Ly
(74) *Attorney, Agent, or Firm* — Erik Swanson; Andrew M. Calderon; Calderon Safran & Cole, P.C (57) ABSTRACT

An approach for retrieving and storing telephone numbers along with related contextual information associated with inbound/outbound communications to/from a device. The approach includes a method that includes combining, by at least one processing device, identification information of an entity and a related communication mechanism used to initiate a communication to a device. The method further includes providing, by the at least one processing device, a soft record that includes the identification information and the related communication mechanism.

14 Claims, 6 Drawing Sheets

(56) References Cited

U.S. PATENT DOCUMENTS

| | | | |
|---|---|---|---|
| 2003/0012353 A1* | 1/2003 | Tang | H04M 3/42042 |
| | | | 379/142.17 |
| 2003/0012354 A1 | 1/2003 | Patterson | |
| 2004/0032941 A1 | 2/2004 | Graham et al. | |
| 2004/0058672 A1 | 3/2004 | Lee et al. | |
| 2005/0032527 A1 | 2/2005 | Sheha et al. | |
| 2005/0053220 A1 | 3/2005 | Helbling et al. | |
| 2005/0117729 A1 | 6/2005 | Reding et al. | |
| 2005/0157858 A1 | 7/2005 | Rajagopalan et al. | |
| 2005/0249343 A1 | 11/2005 | Birch | |
| 2007/0280445 A1 | 12/2007 | Shkedi | |
| 2008/0076399 A1* | 3/2008 | Jegal | H04M 1/2748 |
| | | | 455/414.3 |
| 2008/0248749 A1* | 10/2008 | Bahl | H04W 52/0229 |
| | | | 455/522 |
| 2009/0131088 A1* | 5/2009 | Kirchmeier | H04L 12/1895 |
| | | | 455/466 |
| 2009/0163140 A1 | 6/2009 | Packham et al. | |
| 2010/0064165 A1* | 3/2010 | Kambara | G06F 11/2028 |
| | | | 714/E11.055 |
| 2010/0274792 A1* | 10/2010 | Bhangi | H04M 1/2746 |
| | | | 707/769 |
| 2012/0266107 A1 | 10/2012 | Bates et al. | |
| 2013/0303211 A1* | 11/2013 | Jarvenpaa | H04L 67/1095 |
| | | | 455/466 |
| 2014/0074925 A1 | 3/2014 | Budin | |
| 2014/0120891 A1 | 5/2014 | Chen et al. | |
| 2014/0187201 A1* | 7/2014 | Saatchi | H04M 1/026 |
| | | | 455/411 |

OTHER PUBLICATIONS

Office Action dated Mar. 17, 2022 in related U.S. Appl. No. 16/685,190, 18 pages.
Notice of Allowance dated Aug. 31, 2022 in related U.S. Appl. No. 16/685,190, 9 pages.

\* cited by examiner

METHODS AND SYSTEMS FOR RETRIEVING AND STORING TELEPHONE NUMBERS ALONG WITH RELATED CONTEXTUAL INFORMATION ASSOCIATED WITH INBOUND/OUTBOUND COMMUNICATIONS TO/FROM A DEVICE

FIELD OF THE INVENTION

The present invention generally relates to wired and/or wireless communications, and more particularly, to methods and systems for retrieving and storing telephone numbers along with related contextual information associated with inbound/outbound communications to/from a device.

BACKGROUND

Existing communication and computing technology permits different types of devices, such as smart phones, cellular phones, personal digital assistants (PDAs), etc., to be used for multiple purposes. For example, a device can be used to initiate a communication with other devices (e.g., a smart phone, a landline telephone, etc.), such as a telephone call. When the device is used to initiate an outbound telephone call or to receive an inbound telephone call, a telephone number associated with the outbound telephone call or the inbound telephone call may be saved in a call history list stored by the device. The telephone numbers saved in the call history list may be updated over time based on additional outbound/inbound telephone calls sent/received by the device. The call history list, when displayed by the device, shows the user the list of telephone calls sent/received from/to the device. The device can also be used to send/receive short messaging service (SMS) messages, multimedia messaging service (MMS) messages, and/or other types of communications.

The device can also be used to execute different applications to send/receive other types of information (e.g., webpage content, map content, etc.). For example, the user may use an application (e.g., a web browser application, a map application, etc.) stored by the device to perform a search and receive, via the application, search results.

SUMMARY

In a first aspect of the invention, a method, performed by at least one processing device, may include combining identification information of an entity and a related communication mechanism used to initiate a communication to a computing device associated with the entity. The method further includes providing a soft record that includes the identification information and the related communication mechanism.

In another aspect of the invention, a system includes a CPU, a computer readable storage memory and a computer readable storage media. Additionally, the system includes program instructions to obtain a search request including at least a communication mechanism and identification information associated with the communication mechanism. The system also includes program instructions to combine the communication mechanism and the associated identification information upon an initiation of a communication, program instructions to generate a soft record based on the initiation of the communication. The system also includes program instructions to save the soft record which is displayable on an initiating device initiating the communication. Each of the program instructions are stored on the computer readable storage media for execution by the CPU via the computer readable memory.

In an additional aspect of the invention, a computer program product including a computer usable storage medium having readable program code embodied in the medium is provided. The computer program product includes at least one component operable to receive a search request. The computer program product includes sending the search request to an application server, receive search results from the application server based on the search request. The computer program includes sending the search results to a device and receiving a communication request from the device based on the device receiving a selection of a particular search result from the search results. The computer program product includes sending a request for contextual information to the application server based on receiving the communication request. The computer program product includes receiving the contextual information from the application server, the contextual information including an identifier associated with the particular search result. The computer program product includes generating a soft record, the soft record including the contextual information and a telephone number associated with the communication request. The computer program product also includes sending the soft record to the device, the device displays the identifier associated with the particular search result.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to wired and/or wireless communications, and more particularly, to methods and systems for retrieving and storing telephone numbers along with related contextual information associated with inbound/outbound communications to/from a device. In more specific aspects of the invention, the present invention provides a soft record for a call history log. In embodiments, the soft record includes, for example, a telephone number (or other mechanism required to initiate a communication session, e.g., email address) and contextual information associated with the telephone number. In embodiments, the soft record is a temporary record of a contact that exists as long as a number associated with incoming or outgoing calls is stored in the incoming or outgoing call log, e.g., call history log. In embodiments, when the call history log is deleted, the soft record and associated information can also be deleted. Although the present invention is mainly discussed with reference to a telephone number, one of skill in the art would readily understanding that the present invention can be implemented with other communications such as, for example, an SMS message, a MMS message, and/or any other type of communication.

Advantageously, the soft record can be generated automatically, by use of an agent operable and/or configurable to obtain the contextual information and associate such contextual information with the telephone number of other mechanism required to initiate a communication session. The use of the soft record allows a user to more readily identify the telephone number (or other mechanism required to initiate a communication session, e.g., email address).

By way of example, a user may receive an incoming call which may include a name or other contextual information associated with the incoming call number (or other communication mode). This name or other contextual information would be saved as a "soft contact" for incoming calls, compared to merely the phone number alone. In another example of the present invention, an incoming text can be provided with a phone number embedded therein, or a pop up ad provided online can be provided with a telephone number, any such information of which can be saved in the soft log with the telephone number. In these implementations, it would only be required by the user to click on the number in order to initiate the communication and, in embodiments, have the telephone number and contextual information saved in the soft log. No search would be required in these implementations.

In additional embodiments, using a search, a user, for example, can initiate a search via a web browser application or any other application (e.g., a map application, a social networking application, etc.) in order to retrieve a telephone number or other mechanism required to initiate a communication session, e.g., email address. In the scenario of a telephone call, upon selecting the telephone number, a caller identifier agent can retrieve and/or associate the dialed telephone number with contextual information (e.g., identification of a person or establishment associated with the dialed telephone number), location information and/or any other information) to generate a soft record for a call history log. That is, the caller identifier agent can extract contextual information associated with a telephone number or other communication mechanisms required to initiate a communication session, e.g., email address, an Internet Protocol (IP) address, etc. The soft record may be saved by the requesting device in a list of recent communications (e.g., a call history list, a list of text messages); although it should be understood that the soft record can be saved by other computing devices, e.g., application server, network server, etc.

As a result of implementing the processes and systems of the present invention, the device can display to the user a list of communications (e.g., telephone calls, text messages, etc.), where each communication has an identifier, such as, for example, address information, name of person and/or establishment and/or other types of contextual information. This, in turn, allows the user to identify a particular telephone number and associate such telephone number with a particular identifier. Advantageously, this will prevent the user from spending unneeded time initiating another search to determine an identifier (e.g., a name of a business, address, etc.) associated with a telephone number stored within a call history list.

In embodiments, the caller identifier agent can extract contextual information associated with a telephone number or other mechanism required to initiate a communication session, e.g., email address using heuristic methods (e.g., pattern matching) in order to generate the soft record. For example, by recognizing or determining a particular pattern, e.g., a device is used to initiate a particular number of communications for a particular number of times (e.g., two times, five times, 10 times, etc.) within a particular period of time (e.g., 12 hours, one day, two days, etc.), the caller identifier agent can determine contextual information associated with the particular pattern and generate a soft record. Illustratively, the caller identifier agent may identify that the pattern is associated with a particular type of establishment, e.g., pharmacies, and use this information to associate with the telephone number. In this way, if the caller identifier agent determines that a pattern exists, the caller identifier agent may then retrieve the contextual information and the telephone number to generate the soft record.

In embodiments, the user may select the soft record (e.g., touching the screen, entering a command via a keyboard on the device, issuing a voice command, etc.) from a call history list and initiate a communication (e.g., a telephone call, a text message, etc.) using the telephone number stored in the soft record. The soft record can also be extracted and saved within an address book application stored by the device. Also, in embodiments, the user may configure the caller identifier agent to generate customized soft records. For example, the caller identifier agent may be configured to generate soft records based on the type of communication (e.g., a telephone call, a text message, and/or a MMS message), the type of contextual information to be included within a particular soft record, and/or other features associated with the soft record, as described in more detail below.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. . . . or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
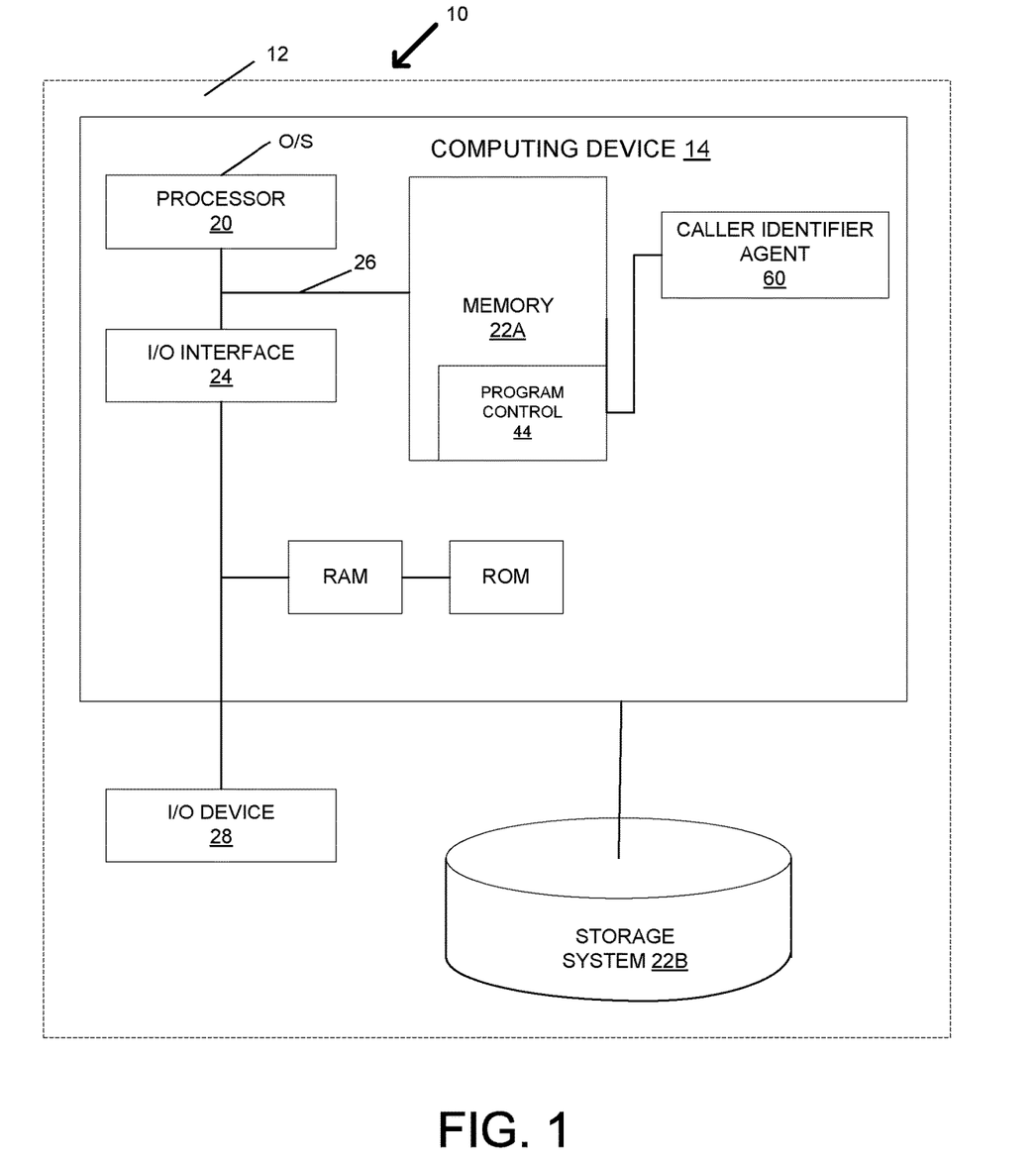
FIG. 1 shows an illustrative environment for implementing the steps in accordance with aspects of the invention.

FIG. 1 shows an illustrative environment 10 for managing the processes in accordance with the invention. To this extent, the environment 10 includes a server or other computing system 12 that can perform the processes described herein. In particular, computing system 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. External I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls a caller identifier agent 60, e.g., the processes described herein. Caller identifier agent 60 can be implemented as one or more program code in program control 44 stored in memory 22A as separate or combined modules. Additionally, caller identifier agent 60 may be implemented as separate dedicated processors or a single or several processors to provide the function of these tools. The caller identifier agent 60 can be resident on a device, e.g., mobile device, on a network server and/or on an application server, e.g., a server which hosts websites, as discussed in more detail below. While executing the computer program code, processor 20 can read and/or write data to/from memory 22A, storage system 22B, and/or I/O interface 24. The program code executes the processes of the invention. The bus 26 provides a communications link between each of the components in computing device 14.

In embodiments, caller identifier agent 60 is configured to correlate a telephone number (or other mechanism required to initiate a communication session, e.g., email address) with related contextual information, and store such correlated information within a soft record in a caller history log. The contextual information may be obtained with a receiving telephone call, or other communication, e.g., a text message, with a telephone number embedded therein or a pop up ad with a telephone number embedded therein. The contextual information and communication mechanism may then be saved as a soft record stored in the device. If the call history log is deleted, then the soft record may also be deleted. The contextual information may include by way of non-limiting and non-exhaustive examples: (i) identifier information (e.g., a person's name, a fictional name associated with a business, etc.), (ii) address information, (iii) geographic information, (iv) information regarding whether the telephone number is associated with a residential location or a business location, (v) hours of operation associated with a business or governmental entity, (vi) images, and/or any other type of information, amongst others.

In embodiments, caller identifier 60 may obtain the contextual information for a soft record using many different methods. By way of example, assuming caller identifier agent 60 is resident on an application server (e.g., a server hosting one or more websites), caller identifier agent 60 may generate the soft record by, for example, using hyper-text markup language (HTML), extensible markup language (XML), and/or any other type of language. For example, a soft record for a particular telephone number (703-555-1212) associated with a particular identifier (XYZ) and a particular location (Miami, FL) may be generated in HTML by caller identifier agent 60, residing on an application server, as:

<contact phonenumber="703-555-1212" alias=" " name=XYZ" street address=" " city="Miami" state="FL">

In this and other examples, the soft record may be a data structure that includes one or more fields of information where each field of information is associated with the telephone number and one or more types of contextual information. Caller identifier agent 60 may save the soft record within a list of recent communications stored by computing device 14, e.g., in a call history log. The list of recent communications may be associated with telephone calls, text messages, and/or any other type of communication. If the computing device 14 represents a device, caller identifier agent 60 may display the telephone number and one or more different types of contextual information (e.g., identifier information) associated with the soft record.

In embodiments, caller identifier agent 60 may be associated with a graphical user interface (GUI) that permits a user to select different options to configure caller identifier agent 60 to generate a soft record. This permits the soft record to be customized with information (associated with HTML, XML, or another language) within the soft agent based on the user's configuration. For example, caller identifier agent 60 may be configured to generate a soft record to include identifier information, in a call history list, for outgoing calls and not incoming calls (or vice versa). Additionally, or alternatively, caller identifier agent 60 may be configured to generate soft records for only a particular type of communication (e.g., SMS messages, telephone calls) and combinations thereof. Additionally, or alternatively, caller identifier agent 60 may be configured to only save one or more particular types of contextual information within a soft record. For example, the user may configure caller identifier agent 60 to save only identifier information associated with telephone numbers derived from searches obtained by a web browser application. Alternatively, for example, the user may configure caller identifier agent 60 to save address, identifier information, and/or hours of operation information within a soft record.

Additionally, or alternatively, caller identifier agent 60 may be configured to extract an image from the search results and include the image within the soft record. For example, if a search result includes an image of a person, establishment, etc., caller identifier agent 60 may save the image in the soft record. In this way, the soft record may include the image with an identifier and/or telephone number in the call history list.

In embodiments, computing device 14 may be part of a device, such as a smart phone, a cellular phone, a laptop, and/or any other type of device capable of receiving/sending communications to other devices. In embodiments, computing device 14 may be part of a computer infrastructure associated with a network service provider of communication services (e.g., Internet services, telephone services, multimedia services, text messaging services, etc.) to a device. In further embodiments, computing device 14 may be part of computer infrastructure associated with an application provider that provides information and/or content associated with an application (e.g., an Internet application, a mapping application, etc.) executable on a device.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, computing infrastructure 12 is only illustrative of various types of computer infrastructures for implementing the invention. For example, in embodiments, computing infrastructure 12 comprises two or more computing devices (e.g., a server cluster) that communicate over any type of communications link, such as a network, a shared memory, or the like, to perform the process described herein. Further, while performing the processes described herein, one or more computing devices on computing infrastructure 12 can communicate with one or more other computing devices external to computing infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
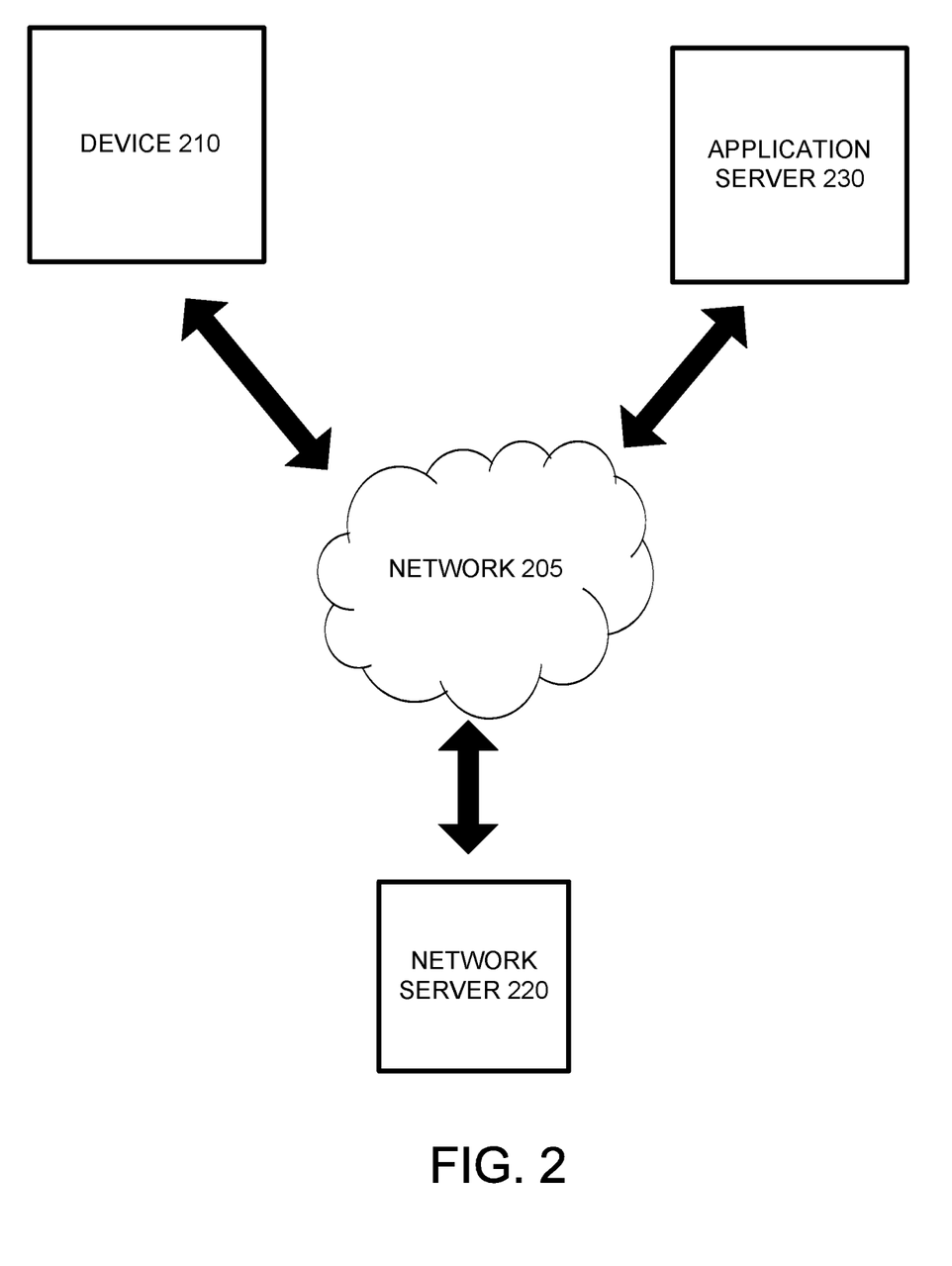
FIG. 2 shows a block diagram of a network system in accordance with aspects of the invention.

FIG. 2 shows a block diagram of a network system in accordance with aspects of the present invention. Specifically, FIG. 2 shows a network 205, a device 210, a network server 220, and an application server 230, any of which can be representative of the computing device of FIG. 1. In embodiments, network 205 may comprise a cellular network, a local area network (LAN), a wide area network (WAN), a telephone network (e.g., the Public Switched Telephone Network (PSTN)), an intranet, a satellite network, a GPS network, a radio access network, wireless fidelity (Wi-Fi), Worldwide interoperability for Microwave Access (WiMAX), and/or a combination of these or other types of networks. Network 205 may permit device 210, network server 220, application server 230, and/or other devices to communicate, e.g., send/receive information. Also, network 205 may include one or more computing devices (such as computing device 14) that are used to facilitate the communications between device 210, network server 220, and/or application server 230.

Device 210 may include any computation or communication device that is capable of communicating with a network (e.g., network 205). For example, device 210 can be representative of computing device 14 as described herein, e.g., a smart phone, a laptop computer, a tablet computer, a personal gaming system, a camera, or another type of computation or communication device. In embodiments, device 210 can receive and/or display content which may be, for example, objects, data, images, audio, video, text, files and/or links to files accessible via one or more networks (e.g., network 205). In embodiments, device 210 can store different types of applications, such as a telephone application, a video application, a web-browsing application, a contacts application, a calendar application, a map application, and/or other types of applications.

Application server 230 may provide search results to the web-browsing application and/or device 210. For example, application server 230 may include one or more server devices that gather, process, search, store, and/or provide information in a manner described herein. For example, application server 230 may be associated with an application that can store information such as, for example, web pages, etc. which can be viewed, downloaded and/or executed on device 210.

Network server 220 may include one or more network devices that gather, process, search, store, and/or provide information in a manner described herein. By way of example, network server 220 may send/receive information between device 210, network server 220, and/or application server 230. Network server 220 may be associated with a network service provider that provides one or more different types of service (e.g., telephone service, satellite service, cellular service, etc.) to device 210 and/or application server 230, as described herein.

In embodiments, caller identifier agent 60 may reside on any combination of device 210, network server 220, and/or application server 230). By using caller identifier agent 60, upon initiating a communication (based on an incoming communication request or an outgoing communication request), a telephone number can be correlated with related contextual information to generate a soft record. The telephone number and contextual information can then be saved as a soft record in a log of recent communications. For example, caller identifier agent 60, stored on device 210, may request the contextual information from application server 230 or network server 220. Application server 230 may send the contextual information to device 210, where caller identifier agent 60 generates a soft record that includes the telephone number and one or more of types of contextual information. The soft record may then be saved in a list of recent communications (e.g., call history log) stored by device 210.

In other embodiments, caller identifier agent 60 may be stored by network server 220. In this implementation, caller identifier agent 60 may request and receive contextual information from application server 230 and generate a soft record that combines the contextual information with a telephone number. Caller identifier agent 60 may store the soft record in network server 220 and provide the soft record to device 210. Device 210 may store the soft record in a list of stored communications (e.g., a call history list).

In still other embodiments, caller identifier agent 60 may be stored by application server 230. In this implementation, upon receiving a search request (via network server 220 and/or network 205) from device 210, application server 230 may initiate a search that results in one or more search results based on the search request. Application server 230 may send the one or more search results to device 210, e.g., including telephone number. Caller identifier agent 60 may generate a soft record based on the telephone number and the contextual information stored by application server 230 as a soft record, and provide the soft record to device 210. User device 210 may save the soft record in a call history log stored by device 210.

In embodiments, caller identifier agent 60, stored by device 210, network server 220, and/or application server 230, can analyze multiple communications and determine that a pattern exists based on a number of communications (associated with a particular person, business, or other search term) that are made within a particular period of time. Based on determining a pattern, caller identifier agent 60 obtains contextual information and generates a soft record that includes a telephone number and contextual information.

Figure 3:
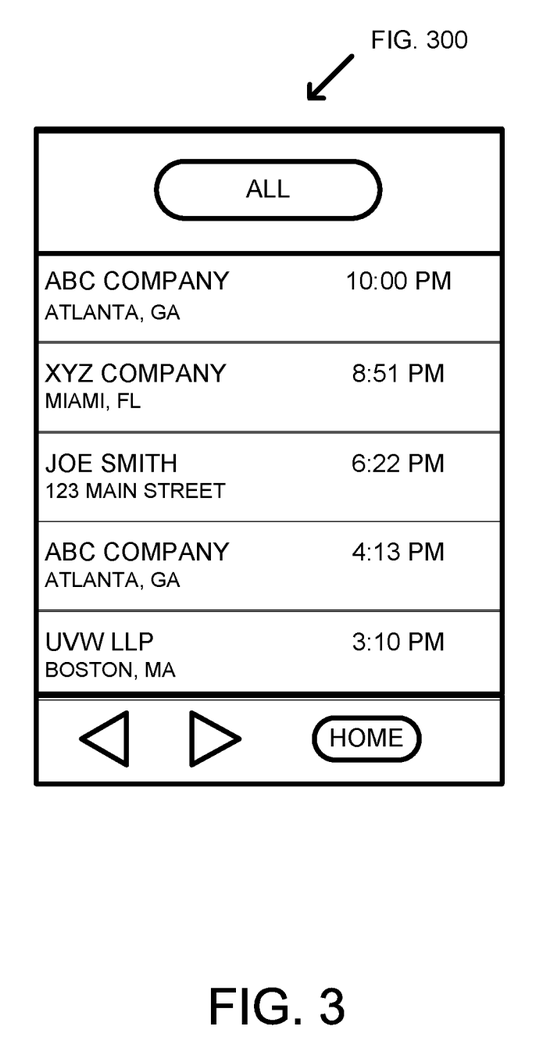
FIG. 3 shows an illustrative representation of a display in a computing device showing a call history log, implementing the processes of the present invention.

FIG. 3 shows a graphical user interface of computing device, e.g., a device that gathers and/or stores related contextual information. Specifically, FIG. 3 shows a display 300 of a computing device with information obtained in accordance with aspects of the present invention. In this example, display 300 includes a telephone number and contextual information associated with the telephone number. The contextual information can be identifier information, such as a person's name, a business, or any other type of identifier. Additionally, or alternatively, the contextual information can be an address or location, and/or other geographic information associated with the telephone number. Additionally, or alternatively, the contextual information can be a combination of the identifier information, the street address information, the geographic information, and/or any other type of information associated with the telephone number. In any scenario, the contextual information can be obtained from caller identifier agent, after initiating a search on a website or other location, which would not have otherwise provided any associated contextual information after initiation of the communication between devices and or applications, for example.

Flow Diagrams

FIGS. 4-7 show exemplary flows for performing aspects of the present invention. For example, the steps of FIGS. 4-7 may be implemented in the environment of FIG. 1 and/or in the block diagram of FIG. 2. The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Figure 4:
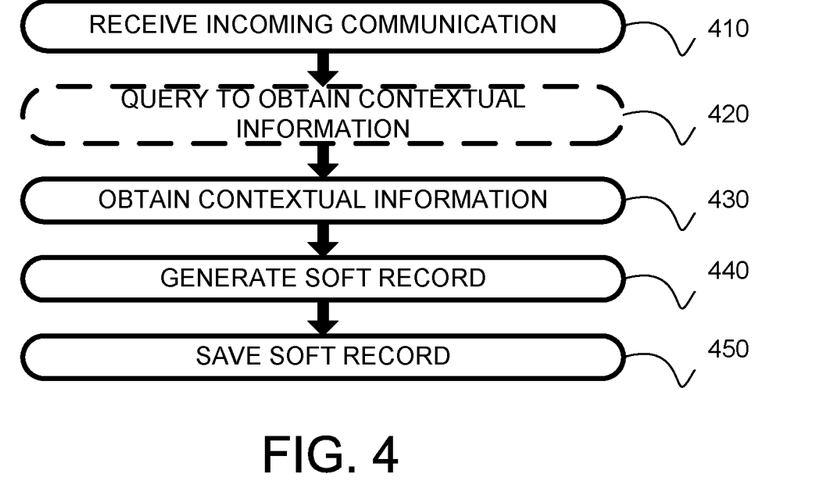
FIGS. 4-7 show exemplary flow diagrams in accordance with aspects of the invention.

FIG. 4 depicts an exemplary flow of processes in accordance with aspects of generating a soft record based on an incoming communication in accordance with aspects of the invention. The steps of FIG. 4 are described with regards to telephone communications between devices or a network server and other devices; however, the present invention also contemplates other types of communications, such as text messaging communications, SMS communications, email communications, and/or other types of communications. In particular, FIG. 4 is described from the perspective of an incoming communication.

At step 410, an incoming communication is received by the receiving device or the network server. The communication may be a telephone call, SMS message, MMS message, or any other type of communication that is being sent by a sending device (e.g., a smart phone, land-line telephone, etc.). The incoming communication may include an identifier (e.g., a person's name or a business name). For example, the incoming communication may be a text message that may include a link (e.g., the message may be "Hi, call (703) 555-1212 to get 20% discount on TV") that includes a telephone number. Alternatively, for example, the incoming communication may be a telephone call from another device that includes a telephone number and an identifier associated with the telephone number. The receiving device or the network server receives the incoming communication from a sending device. The user has the option (using the receiving device) to accept the communication and initiate a communication with the sending device, such as by selecting a telephone number associated with the link within a text message or accepting an incoming telephone call. In optional embodiments, at step 420, when the contextual information is not embedded with the incoming communication, for example, a query can be made by the receiving device or the network server to obtain the contextual information associated with the incoming communication. In embodiments, the receiving device may query the network device or the sending device. Alternatively, the network device may directly query the sending device for the contextual information.

At step 430, contextual information is obtained by the receiving device or the network server. For example, the receiving device may obtain the contextual information from the network server or the sending device. It should be understood that this contextual information may be obtained based on the query, or it can be embedded within the receiving communication. For example, when the incoming communication is a text message or a pop-up advertisement, the contextual information can be provided with the communication mechanism, e.g., telephone number. For example, the contextual information may be sent in HTML, XML, or another language.

At step 440, a soft record is generated by the receiving device or the network server. For example, caller identifier agent (stored by the receiving device or the network server) may combine the telephone number (associated with the incoming communication) with the related contextual information. For example, caller identifier agent may combine an identifier (e.g., a name such as John Smith), an address (e.g., 123 Main Street, Miami, Florida) and the telephone number to generate the soft record. At step 450, the soft record is saved by the receiving device or the network server. For example, caller identifier agent may save the soft record in the receiving device or the network server. If the receiving device saves the soft record, the soft record may be saved in a contact history list that includes incoming, outgoing, and/or missed communications. In embodiments, the user may be given the option to save the soft record in an address book application stored by the receiving device. If the network server saves the soft record, the network server may send the soft record to the receiving device when requested by the receiving device.

Figure 5:
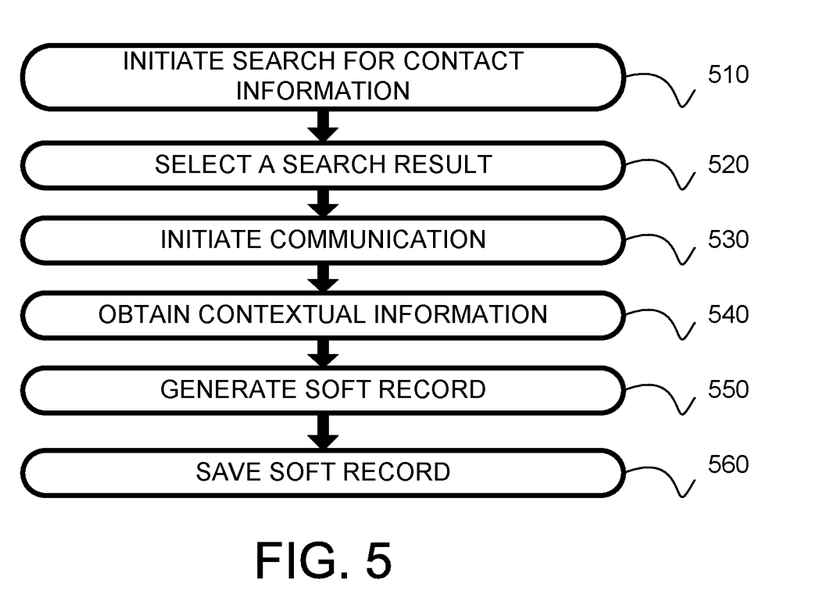

FIG. 5 depicts an exemplary flow for generating a soft record in accordance with aspects of the invention. The steps of FIG. 5 are described with regards to any type of wireless and/or wired communications between devices. For example, the communication may be associated with a telephone communication, text messaging communication, SMS communication, email communication, and/or other types of communications amongst two or more different devices. In embodiments, the steps described by FIG. 5 may be performed by a mobile device; however, the present invention contemplates one or more steps being performed by one or more other computing devices, such as a network server or an application server.

At step 510, a search is initiated, using, for example, an application (e.g., a web browser application, a map application, etc.) stored by a requesting device. In embodiments, the requesting device sends the request (via a network server) to an application server. The application server receives the request and provides search results to the device. The search results are then displayed by the device. The search results may be provided within the application, such as within a web page being provided by a web browser application, within a map being provided by a map application, or any other type of application being used by the user of the device.

At step 520, a search result can be selected by the user. The selected search result may include a telephone number and any related contextual information obtained from the application server. This contextual information may be correlated and/or associated with the telephone directly from the application server. At step 530, a communication is initiated by the user by selecting a link within the application (such as a link within a web page being provided by the web browser application) associated with the selected search result. For example, the user may select the link by using a device keypad, a touch screen display, voice recognition, and/or any other method for selecting a link displayed by the device. The communication may be a telephone call, a SMS message, a text message, a MMS message, or any other type of communication; although this information may be obtained at the time that the search result is uploaded onto the device.

At step 540, contextual information is obtained upon the initiation of the communication. For example, upon determining that a communication is initiated based on a selected search result, a caller identifier agent retrieves the contextual information (e.g., retrieving the contextual information from a web page being displayed on the device) from the obtained search result, already obtained by the device. That is, in embodiments, the contextual information can be automatically provided to the requesting device when the search results are sent to the application being used on the device. In aspects of the invention, a smart phone application can pass a phone number and contextual information to the device. For example, when an application or browser has a telephone number within its content and the device initiates a communication from that application/browser, it will pass the contextual information to the device. Alternative methods contemplated by the present invention may also request the contextual information (via the network and/or the network server) from application server (or network server) at the initiation of the communication.

At step 550, a soft record is generated by caller identifier agent. For example, caller identifier agent combines the telephone number (used to initiate a communication) with the related contextual information and saves this information together in a soft record. For example, the caller identifier agent may combine an identifier (e.g., John Smith), address (e.g., 123 Main Street, Miami, Florida) and the telephone number in order to generate a soft record. The caller identifier agent may generate the soft record by using HTML, XML, or any other type of language or code.

At step 560, the soft record is saved by the caller identifier agent. The soft record may be saved in a call history list that includes incoming, outgoing, and/or missed communications. The device can display the soft record as one of a list of communications within a call history list stored by the device. As the soft record includes an identifier (such as a business name), the user is able to identify the displayed telephone number with a particular person or business entity or other identifying information. The user may be given the option to save the soft record in an address book application stored by the device.

Figure 6:
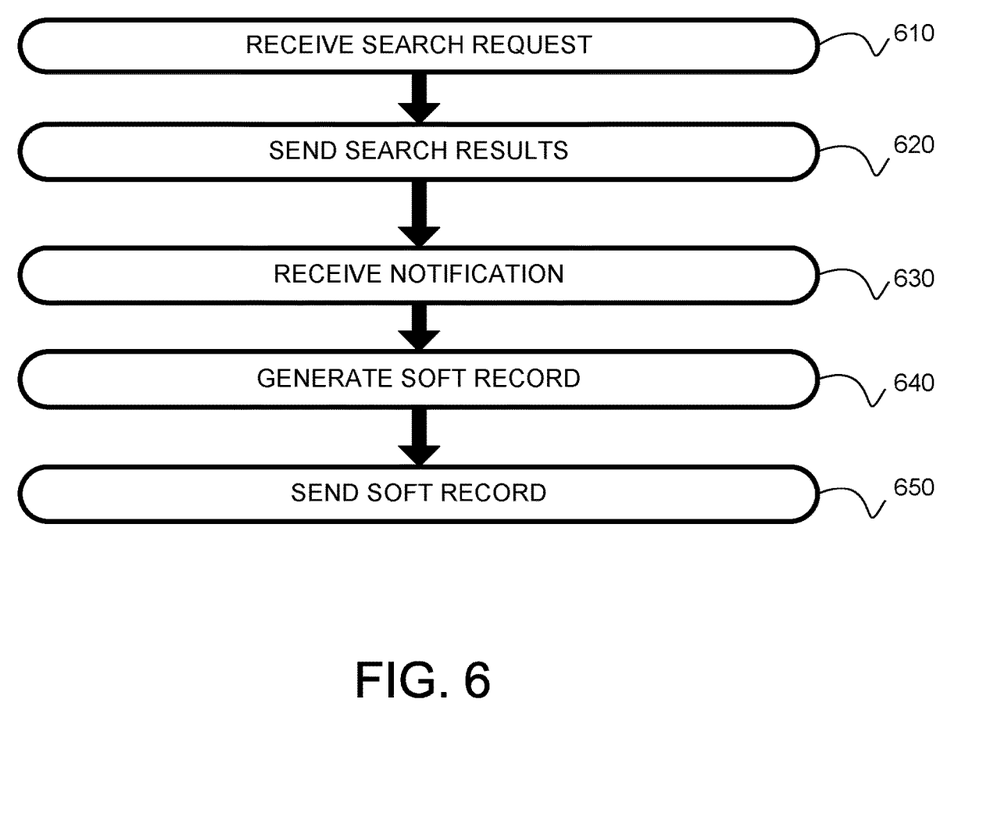

FIG. 6 depicts an exemplary flow for generating a soft record in accordance with aspects of the invention. In embodiments, the processes described in FIG. 6 may be performed by an application server; although, one or more steps in the processes may be performed by one or more other devices, such as a device or a network server.

At step 610, a request for information associated with a search request is received by the application server. The search request may be from a device or network server. The search request may be associated with a search request for a web-page displayed on by the application server, including for example, a search request associated with a geographic location displayed on the device, e.g., a location on a map, and/or any other type of search request. Upon receiving the request, the application server may save an identifier (e.g., such as a MDN identifier) that identifies the requesting device (or a network server). At step 620, the search results are sent by the application server to the network server. The network server may receive the search results and send the search results to the device. In embodiments, the network server may save, in a database, the device identifier along with an identifier for the application server. The search results may include one or more telephone numbers or other communications methods, associated with one or more different organizations (e.g., businesses, governmental, non-profit, etc.) and/or individuals. The search results may be displayed to the user, on the device, as a web page, map, or any other type of graphical and/or textual display.

At step 630, the application server receives a notification from the network server that the device has initiated a communication (e.g., a telephone call, SMS message, etc.) based on selecting one of the search results sent to the device. The network server may send the notification to the application server when the network server receives a communication request from the device. In embodiments, the network server may match the device identifier with an identifier for the application server, saved in a database, to determine whether to send the notification to the application server.

The notification may include an identifier of the device and also the telephone number associated with the communication. Upon receiving the notification, the application server may match the identifier of the device with the search results sent by the application server to the device (e.g., by analyzing a database that stores different device identifiers associated with different devices). Additionally, the application server may use the telephone number to retrieve the contextual information, associated with the telephone number, from the search results. The contextual information may be also sent and received by the network server at the initiation of the search, communication and/or another action.

At step 640, in response to receiving the notification, a soft record is generated by the application server. The application server (using HTML, XML, and/or any other language) may generate the soft record by using a caller identifier agent. The soft record includes, for example the telephone number and one or more types of contextual information (e.g., identifier information, address information, etc., associated with a search result). The soft record may also be saved by application server.

At step 650, the soft record is sent to the device or the network server by, for example, caller identifier agent (stored by the application server). The device may store the soft record within a list of communications sent/received by the device. Alternatively, if soft record is sent to the network device, the network device can save the soft record and then send the soft record to the device. The soft record may include, for example, identifier information, address information, telephone number, and/or other information associated with a communication initiated by the device. In this way, the device may display the soft record to the user when the user requests a call history log to be displayed on the device.

Figure 7:
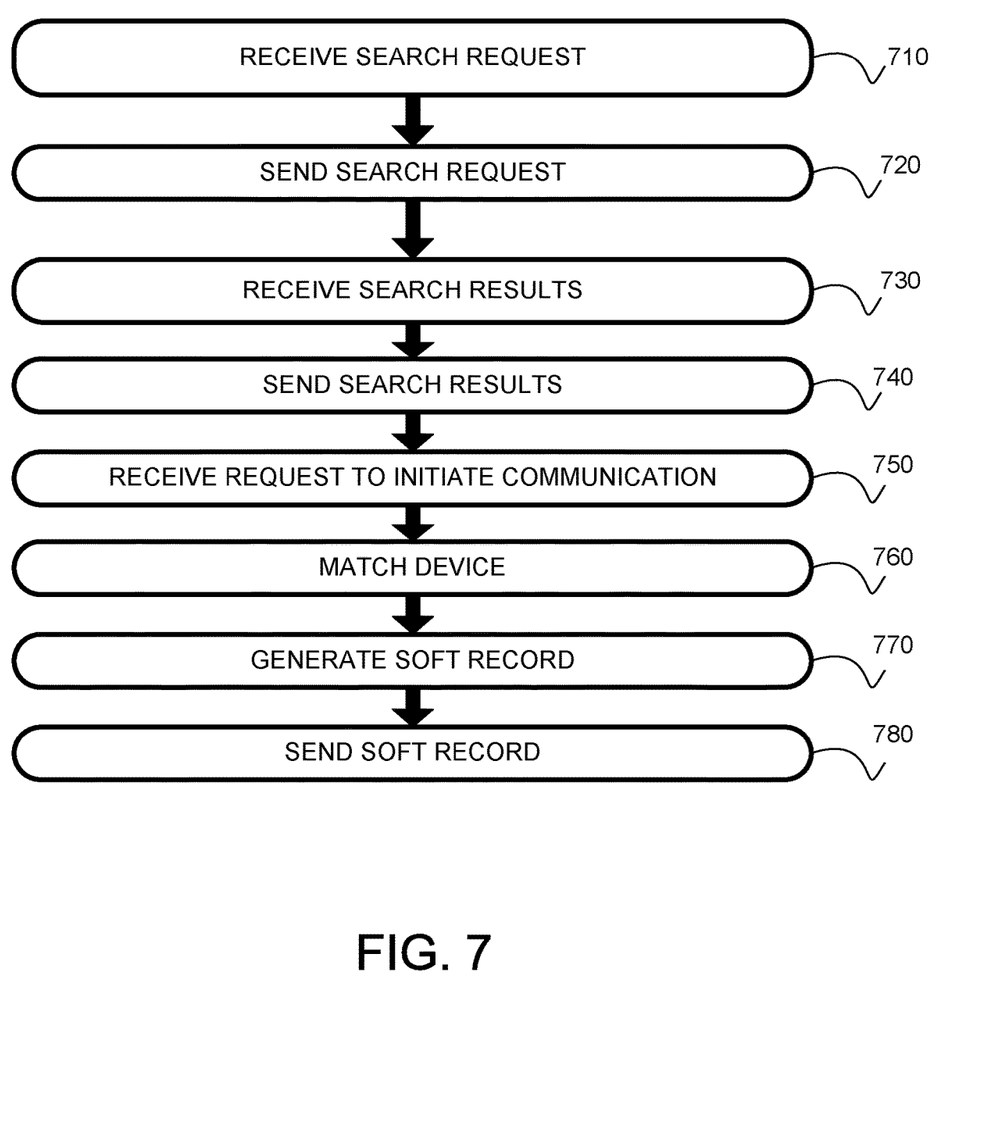

FIG. 7 depicts an exemplary flow of processes for generating a soft record in accordance with aspects of the invention. In embodiments, the processes described in FIG. 7 may be performed by a network server; although, one or more steps in the processes described by FIG. 7 may be performed by one or more other devices, such as a device or an application server.

At step 710, a search request is received by a network server. In embodiments, the network server may save identifier information for the device making the request. As in any of the embodiments described herein, the identifier information may be a mobile device number (MDN) identifier, an Internet Protocol (IP) address, and/or any other type of identifier used to identify the device. In embodiments, the network server may receive multiple search requests, from different devices, that are to be forwarded to different application servers, in which case the different application servers may be associated with different types of applications that can be executed on the device, such as a web-browser application, a map application, and/or any other type of application.

At step 720, the network server sends the search request to the application server. At step 730, the search results are received by the network server from the application server. The search results may include contextual information associated with different telephone numbers; although this information can be retrieved at a later processing stage. The network server may store an identifier for the application server and the identifier of the device that made the search request. At step 740, the network server sends the search results to the device.

At step 750, a communication request is received by the network server. For example, the network server may receive the communication request when a user selects one of the search results and initiates a communication. The communication request may be associated with a telephone call, SMS message, MMS message, and/or any other type of communication. The network server may initiate the communication or send the communication request to another server to initiate the communication.

At step 760, the network server matches an identifier for the device associated with the requested communication. For example, the network server may include a database that stores device identifiers associated with search results received from different application servers. For example, the database may store information that device A received search results from application server 1 and device B received search results from application server 2. In this way, the network server may match the device identifier with a particular application server.

In embodiments, once a match is made, the network server may send a request to the particular application server and request contextual information associated with the telephone number being used by the device to initiate the communication. The application server may receive the request and send the contextual information, written in HTML, XML, or any other language, to the network server. Alternatively, the network server may retrieve the contextual information which is already stored by the network server. The network server may have received the contextual information when the network server received the search results from the application server as described in step 730.

At step 770, a soft record is generated by a caller identifier agent stored by the network server. The caller identifier may generate the soft record in HTML, XML, or any other type of language. The soft record can include, for example, the telephone number and one or more types of contextual information (e.g., identifier information, address information, etc., associated with a search result). The soft record may be saved by the network server.

At step 780, the soft record is sent to the device, where it is saved as an entry in a call history list. In this way, the user may use the soft record (from a list of displayed communications) to identify a displayed telephone number. The user may be given the option to save the soft record in an address book application stored by the device.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer usage storage device having readable program code embodied in the storage device, the computer program product includes at least one component operable to:
   receive a search request;
   store a device identifier for a device making the search request;
   send the search request to an application server;
   receive search results from the application server based on the search request;
   store a server identifier for the application server;
   send the search results to the device;
   receive a communication request from the device based on the device receiving a selection of a particular search result from the search results;
   match the device identifier associated with the communication request with the server identifier for the application server;
   receive an image from the particular search result;
   send a request for contextual information to the application server based on receiving the communication request and the device identifier associated with the communication request being matched to the server identifier for the application server;
   receive the contextual information from the application server, wherein the contextual information is extracted from the particular search result using heuristic pattern matching to identify a type of establishment associated with a telephone number, and the contextual information includes the type of establishment, the device identifier associated with the particular search result, and address information associated with the particular search result;
   generate a soft record, wherein the soft record includes the contextual information comprising the type of establishment, the device identifier, the address information, the image associated with the particular search result, and the telephone number associated with the communication request; and
   send the soft record to the device, wherein the device displays the device identifier associated with the particular search result and an option to save the soft record in an address book application on the device.

2. The computer program product of claim 1, wherein the device identifier includes geographic location information.

3. The computer program product of claim 1, further comprising the at least one component operable to store the soft record within a call history log of the device.

4. The computer program product of claim 3, wherein the soft record is a temporary record of a contact that exists as long as a number associated with incoming or outgoing calls is stored in the call history log.

5. The computer program product of claim 1, wherein the soft record is generated using Hyper-Text Markup Language (HTML).

6. The computer program product of claim 1, wherein the device identifier includes an image.

7. The computer program product of claim 1, wherein the search request is associated with a web-page application stored by the application server, and the application server is programmed to generate the soft record.

8. The computer program product of claim 1, wherein a network server generates the soft record by obtaining the device identifier upon receiving the search results.

9. The computer program product of claim 1, wherein the soft record is generated using extensible markup language (XML).

10. The computer program product of claim 1, wherein the device identifier for the device comprises a mobile device number (MDN) identifier.

11. The computer program product of claim 1, further comprising matching the device identifier for the device with the communication request.

12. The computer program product of claim 1, wherein the application server is associated with a web-browser application that is executed on the device.

13. The computer program product of claim 12, wherein the device identifier is stored in a database in a network server.

14. The computer program product of claim 13, further comprising identifying the telephone number based on the soft record from a list of displayed communications on the device.

* * * * *